United States Patent Office 2,907,792
Patented Oct. 6, 1959

2,907,792
OXIDATION OF ORGANIC SUBSTANCES

James Eric McIntyre, Harrogate, England, assignor to Imperial Chemical Industries Limited, London, England, a corporation of Great Britain No Drawing. Application August 24, 1956
Serial No. 605,938

Claims priority, application Great Britain August 24, 1955

12 Claims. (Cl. 260—523)

This invention relates to an improved process for the oxidation of organic substances by means of oxygen or an oxygen-containing gas.

It is known to oxidise organic compounds by means of oxygen or an oxygen-containing gas, conducting the oxidation in a liquid medium such as water or a stable organic solvent, usually a carboxylic acid. It is also known that in many oxidation processes oxidation catalysts are essential to obtain even small yields and that as catalysts certain metals may be used. The most useful catalysts are metals of variable valency such as cobalt, chromium, manganese, lead, iron, copper, nickel and vanadium. It is also known to reduce reaction times and increase yields by operating under superatmospheric pressure and at high temperatures.

According to the present invention, in a process for the oxidation of organic compounds in a liquid aqueous phase, by means of oxygen or an oxygen-containing gas and, if desired, in the presence of an oxidation catalyst, we provide the improvement which comprises carrying out the oxidation in the presence of bromine or a bromine-containing substance. The improvement may be obtained when the oxidation process is operated at atmospheric pressure or at superatmospheric pressure and at an elevated temperature.

The bromine may be used as such or more conveniently in the form of a compound such as a bromide, e.g. hydrogen bromide, a metallic bromide or an organic bromide.

The process of our invention is of particular value in the oxidation of organic compounds containing one or more benzene rings substituted with at least one alkyl or partially oxidised alkyl group. For example, xylenes, toluic acids or para-diisopropyl benzene may be readily oxidised to give high yields of dicarboxylic acids. However, the improvement of our process is applicable to oxidation processes using oxygen or an oxygen-containing gas starting with a wide range of materials. We have, for example, oxidised carbonaceous materials such as charcoal directly to benzene polycarboxylic acids. When our improvement is applied to the oxidation of more readily oxidisable materials, the yield is improved and in some cases quantitative yields have been obtained.

The catalyst metals are commonly used as oxides or salts and are preferably in such a form that the metal ion is available. As a source of the metal ion and the bromide ion, one can use the metallic bromide or a salt or salts of the metal or metals capable of producing the catalytic metal ion, such as manganese or cobalt acetates, together with a substance capable of producing a bromide ion under the reaction conditions. For this purpose, hydrogen bromide, sodium bromide or any other readily soluble bromide, or an organic bromide, such as an alkyl or aryl-alkyl bromide may be used.

It is believed that the bromine acts as the bromide ion during the process and that only small quantities of the bromine are actually required for the reaction. Because of this, we prefer to use bromine-containing substances which dissolve, at least to some extent, in the water.

Of the various metal catalysts, we have found that vanadium, copper and manganese give excellent results; the vanadium being particularly useful when combined with hydrogen bromide.

The following examples illustrates but do not limit the scope of our invention.

EXAMPLE 1

Para-toluic acid, water and the bromine compounds listed below are charged to a stainless steel autoclave (A) or to an enamel-lined autoclave (B), both equipped with mechanical agitation, and oxygen is added to a pressure of 450 pounds per square inch. The autoclave is heated to 200° C.; after two hours it is cooled and the products are isolated. The yields of terephthalic acid obtained, are listed in the table.

Table

| p-toluic acid, parts | Water, parts | Added compounds | parts | Autoclave | Terephthalic acid yield, percent | |
|---|---|---|---|---|---|---|
| | | | | | on p-toluic acid charged | on p-toluic acid consumed |
| 60 | 600 | hydrogen bromide. | 3 | A | 44 | 81 |
| 40 | 400 | ethyl bromide. | 5 | A | 67 | 83 |
| 40 | 400 | hydrogen bromide. | 2 | B | 89 | 96 |
| 40 | 400 | sodium bromide. hydrogen chloride. | 5 2 | B | 88 | 96 |

By way of comparison the process is repeated with no bromide present in one case and with hydrogen chloride used instead of a bromide in the other. The results are as follows.

| 60 | 600 | ------ | -- | A | 7 | 17 |
| 60 | 600 | hydrogen chloride. | 3 | A | 15 | 46 |

The improvement obtained when a bromide is present can be clearly seen. As such high yields are obtained, based on the toluic acid consumed, the process is well suited for continuous operation, the unoxidised toluic acid being returned to the oxidising autoclave.

EXAMPLE 2

Various organic compounds (20 parts each) are charged together with 200 parts of 2% aqueous hydrogen bromide to a glass-lined rotating autoclave, and oxygen gas is introduced to a pressure of 400 pounds per square inch. The autoclave is heated, with rotation, to 180° C.; after two hours at 180° C. it is cooled and the products are isolated.

| Compound oxidised | Product | Yield, percent | |
|---|---|---|---|
| | | On starting material charged | On starting material consumed |
| o-toluic acid | phthalic acid | 82 | 93 |
| m-toluic acid | isophthalic acid | 93 | 97 |
| p-aldehydo benzoic acid | terephthalic acid | 96 | 99 |

This example illustrates the high yields obtained using the process of our invention. These yields are higher than those previously obtained in a one-stage oxidation process using oxygen or an oxygen-containing gas.

EXAMPLE 3

A liquid organic compound (80 parts), water (900 parts), and hydrogen bromide (quantity specified below) are charged to a stainless steel autoclave equipped with a reflux condenser. The autoclave is heated to 200° C. and air at 380 pounds per square inch pressure is passed through the liquid phases at 120 litres per hour (measured at atmospheric pressure). Some corrosion of the autoclave occurs. After the time given, the autoclave is cooled and discharged, and the following products are isolated.

| Compound oxidised | Hydrogen bromide, parts | Duration, hours | Products, yields, percent |
| --- | --- | --- | --- |
| p-xylene | 4 | 16.5 | Terephthalic acid, 29. p-tuluic acid, 37. |
| Acetophenone | 10 | 20 | Benzoic acid, 74. |
| p-diisopropyl-benzene | 4 | 20 | Terephthalic acid, 40. |

By way of comparison, when an attempt is made to oxidise the diisopropyl benzene directly to terephthalic acid without the bromide present, a very low yield of terphthalic acid is obtained. It should be noted that as corrosion occurs on the surface of the stainless steel autoclave, it is possible that iron is assisting the oxidation by acting catalytically.

EXAMPLE 4

Into a glass tube containing an organic compound (5.5 parts) and 100 parts of aqueous hydrogen bromide of the strength given below, is introduced a smaller tube, open at the top, containing 100 parts of hydrogen peroxide of 100-volume strength. The outer tube is sealed and heated at 80–100° C. to decompose the hydrogen peroxide to oxygen. The tube is then heated at 200° C. for two hours, allowed to cool, and opened. The following products are isolated.

| Compound oxidised | Hydrogen bromide strength, percent | Product | Yield percent on starting material charged |
| --- | --- | --- | --- |
| p-toluene sulphonic acid | 1 | p-sulphobenzoic acid. | 41 |
| p-nitro toluene | 5 | p-nitrobenzoic acid | 88 | p-Toluene sulphonic acid is a material which is not readily oxidised except with powerful oxidising agents, e.g. alkaline potassium permanganate.

EXAMPLE 5

10 parts of gamma-picoline and 120 parts of 10% hydrogen bromide are charged to an enamel-lined autoclave equipped with mechanical agitation, and oxygen gas is introduced to a pressure of 450 pounds per square inch. The autoclave is heated, with agitation, to 200° C.; after 5 hours at 200° C. it is cooled and the products are discharged. 4.3 parts of unchanged gamma-picoline are recovered and 10.3 parts of copper isonicotinate (nitrogen content 7%) are obtained by precipitation from acidic solution using excess of copper acetate. The yield of isonicotinic acid is 84% based on gamma-picoline consumed.

EXAMPLE 6

Charcoal (200 parts) is added to water (4,000 parts) containing 40 parts of hydrogen bromide in an autoclave. Oxygen is introduced to a pressure of 750 pounds per square inch gauge pressure and the autoclave is heated to 200° C. with continuous agitation. Oxygen is slowly absorbed. After 4 hours the autoclave is cooled and the products separated. Non-acidic charcoal (153 parts), humic acid (30 parts) and benzene polycarboxylic acids (32 parts as lead salt) are isolated.

EXAMPLE 7

Into a glass tube containing 2 parts para-diisopropyl benzene, 100 parts water, 5 parts hydrogen bromide and the amounts of catalyst as shown in the table, is introduced a smaller tube, open at the top, containing 100 parts of hydrogen peroxide of 100-volume strength. The outer tube is sealed, and heated at 80–100° C. to decompose the hydrogen peroxide to oxygen. The tube is then heated at 200° C. for four hours, allowed to cool, and opened. Terephthalic acid is isolated in the quantities shown.

| | Catalyst | Amount | Terephthalic acid |
| --- | --- | --- | --- |
| (a) | Ammonium vanadate | 1 | 1.2 |
| (b) | Ferrous sulphate | 1 | 0.97 |
| (c) | Copper acetate | 1 | 0.78 |
| (d) | Copper acetate / Cobalt acetate | 0.5 / 0.5 | 0.99 |
| (e) | Copper acetate / Ferrous sulphate | 0.5 / 0.5 | 0.75 |
| (f) | Ferrous sulphate / Vanadium pentoxide | 0.5 / 0.5 | 0.79 |
| (g) | Manganese acetate / Vanadium pentoxide | 0.5 / 0.5 | 1.12 |
| (h) | Cobalt acetate / Vanadium pentoxide | 0.5 / 0.5 | 0.85 |
| (i) | Ferrous sulphate / Nickel sulphate | 0.5 / 0.5 | 0.71 |

This example illustrates the oxidation of diisopropyl benzene in the presence of hydrogen bromide and various known oxidation catalysts. Para-diisopropyl benzene is difficult to oxidise directly to terephthalic acid and using the same catalysts but no hydrogen bromide, less than 0.1 part of terephthalic acid is obtained. From the table it can be seen that of the various catalysts listed, a vanadium catalyst used on its own gives the best results, in conjunction with hydrogen bromide.

EXAMPLE 8

The following example illustrates the oxidation of a number of organic compounds using the process of Example 7. The table sets out the compounds, the catalyst (1 part in every case) and the amount of the product obtained. In all cases, 2 parts of the starting material are used.

| Starting Material | Catalyst | Time at 200° C., hrs. | Product | Amount |
| --- | --- | --- | --- | --- |
| Acetophenone | ammonium vanadate. | 6 | benzoic acid | 1.2 |
| Ethylbenzene | vanadium pentoxide. | 4 | do | 0.9 |
| Isopropyl benzene | vanadium pentoxide. | 4 | do | 1.2 |
| Cumic acid | vanadium pentoxide. | 4 | Terephthalic acid. | 1.65 |
| Hydroxy cumic acid | do | 4 | do | 1.03 |

When no catalyst is present only very low yields of the products are obtained, e.g. hydroxy cumic acid yields only 0.07 part terephthalic acid. Without the hydrogen bromide again very low yields are obtained, in some cases so low that none of the desired product could be identified.

EXAMPLE 9

10 parts of the organic compounds, together with the amount of metal bromides, shown in the table, and 300 parts of water are heated in an autoclave under a pressure of 30 atmospheres of oxygen to 200° C. and held at this temperature for 3 hours. The product is cooled and filtered. The filtered material contains terephthalic acid and is obtained in an amount corresponding to the yields on the weight of the original para-diisopropyl benzene used, shown in the table.

| Starting Material | Catalyst | Amount | Yield, percent |
|---|---|---|---|
| Para-diisopropyl benzene. | Manganese bromide | .2 | 45 |
| Do | Ferrous bromide | .2 | 53 |
| Do | Copper bromide | .2 | 58 |
| Do | Manganese and copper bromide. | .1 .1 | 60 |
| Cumic acid | do | .1 | 80.5 |
| alpha, alpha'-dihydroxy diisopropyl benzene. | do | .1 | 52.2 |
| para-diacetyl benzene | do | .1 | 61.5 |

In this example the catalyst and the bromine are provided in the form of a catalytic metal bromide. When para-diisopropyl benzene is oxidised under the same conditions replacing the manganese and copper bromides, used in combination, by a mixture of their chlorides or sulphates, the yield of terephthalic acid is 10% and 16% respectively. When a mixture of manganese and copper acetates is used, no terephthalic acid can be identified in the product.

What I claim is:

1. A process for the oxidation of aromatic compounds substituted with at least one member selected from the group consisting of alkyl and partially oxidized alkyl groups having from 1 to 3 carbon atoms, which comprises oxidizing with a gas selected from the group consisting of oxygen and oxygen-containing gases, into a liquid aqueous phase containing said aromatic compound and wherein the oxidation of said alkyl and partially oxidized alkyl groups to a carboxylic acid group takes place in the presence of bromine.

2. A process according to claim 1, wherein the aromatic compound contains at least one benzene ring substituted with at least one member selected from the groups consisting of alkyl and partially oxidized alkyl groups having from 1 to 3 carbon atoms.

3. A process according to claim 1, wherein the aromatic compound is a toluic acid.

4. A process according to claim 1, wherein the aromatic compound is a xylene.

5. A process according to claim 1, wherein the aromatic compound is a diisopropyl benzene.

6. A process according to claim 1, wherein the process is carried out at superatmospheric pressure at an elevated temperature.

7. A process according to claim 1, wherein the bromine element is introduced in the form of a bromine-containing substance soluble in the liquid aqueous phase under the oxidation conditions.

8. A process according to claim 1, wherein a vanadium containing compound is also present as an oxidation catalyst.

9. A process for the manufacture of terephthalic acid, wherein a para-substituted benzene compound is oxidized with a gas selected from the group consisting of oxygen and oxygen-containing gases, in a liquid aqueous phase wherein the oxidation takes place in the presence of bromine.

10. A process according to claim 9, wherein the oxidation takes place in the presence of a catalytic metal ion and a bromide ion.

11. A process according to claim 10, wherein at least one of the catalytic metal ions is manganese.

12. A process according to claim 10, wherein at least one of the catalytic metal ions is copper.

References Cited in the file of this patent

UNITED STATES PATENTS

| | | |
|---|---|---|
| 1,815,985 | Pansegrau | July 28, 1931 |
| 2,120,672 | Mares | June 14, 1938 |
| 2,276,774 | Henke et al. | Mar. 17, 1942 |
| 2,391,740 | Raley et al. | Dec. 25, 1945 |
| 2,415,800 | Rust et al. | Feb. 11, 1947 |
| 2,444,924 | Farkas et al. | July 13, 1948 |
| 2,746,990 | Fortuin et al. | May 22, 1956 |